H. McCORNACK.
INTERNAL COMBUSTION ENGINE.
APPLICATION FILED NOV. 18, 1910.
1,172,472.  Patented Feb. 22, 1916.
3 SHEETS—SHEET 1.
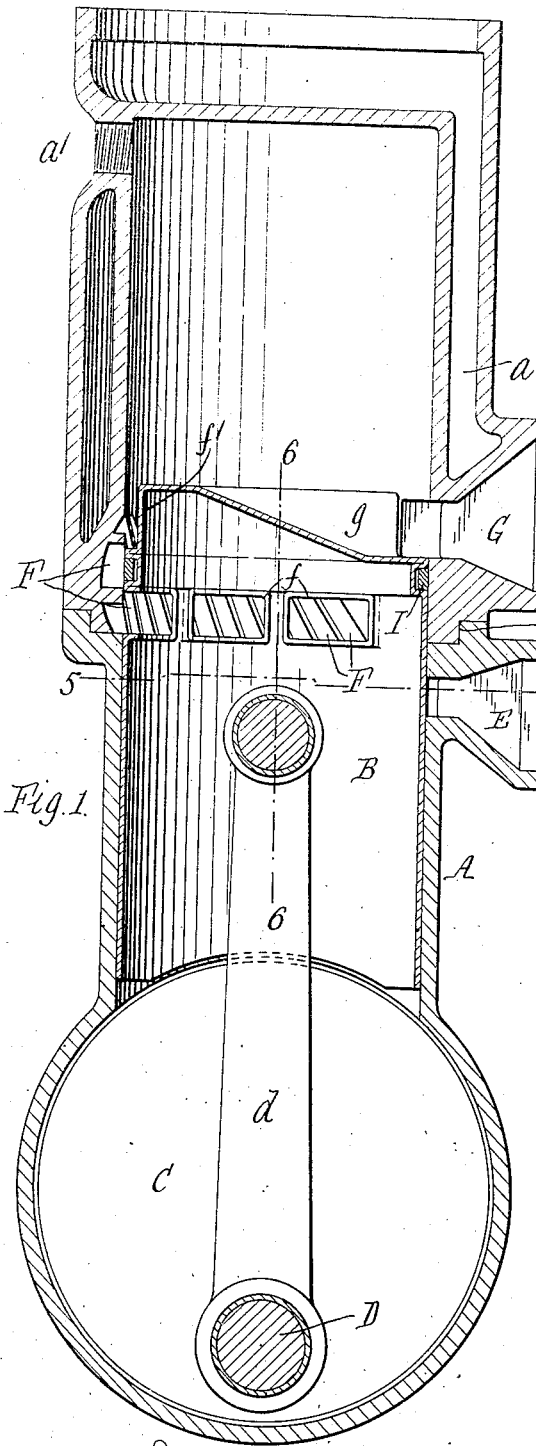
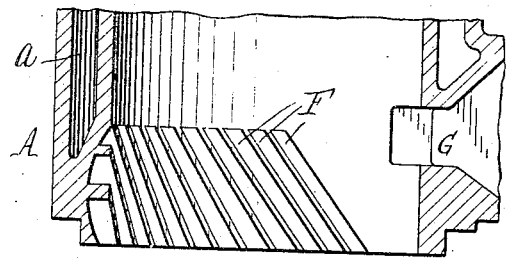
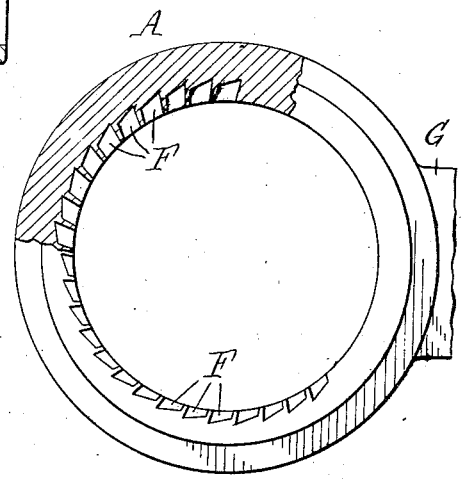

H. McCORNACK.
INTERNAL COMBUSTION ENGINE.
APPLICATION FILED NOV. 18, 1910.

1,172,472.

Patented Feb. 22, 1916.
3 SHEETS—SHEET 2.

Witnesses.
A. G. Dumont
C. H. Bund.

Inventor.
Herbert McCornack,
By Wilhelm, Parker & Hard,
Attorneys.

H. McCORNACK.
INTERNAL COMBUSTION ENGINE.
APPLICATION FILED NOV. 18, 1910.

1,172,472.

Patented Feb. 22, 1916.
3 SHEETS—SHEET 3.

Witnesses.
A. G. Dimond.
C. H. Bund.

Inventor.
Herbert McCornack,
By Wilhelm, Parker & Hand,
Attorneys.

UNITED STATES PATENT OFFICE.

HERBERT McCORNACK, OF WEST CHESTER, PENNSYLVANIA.

INTERNAL-COMBUSTION ENGINE.

1,172,472.          Specification of Letters Patent.      Patented Feb. 22, 1916.

Application filed November 18, 1910. Serial No. 593,073.

*To all whom it may concern:*

Be it known that I, HERBERT McCORNACK, a citizen of the United States, residing at West Chester, in the county of Chester and State of Pennsylvania, have invented a new and useful Improvement in Internal-Combustion Engines, of which the following is a specification.

This invention relates to that type of internal combustion engines, commonly termed two-cycle engines, in which a charge of fuel is exploded in the cylinder for every two strokes of the piston, and more particularly to engines of this type in which the charge of fuel is admitted to the cylinder with a whirling or rotary movement during the last portion of the power stroke of the piston, shortly after the exhaust port is opened, so that the incoming fresh fuel acts to scavenge the cylinder, or drive out the burnt gases.

The objects of the invention are to produce an efficient engine of this sort which is of simple, inexpensive and practical construction, which insures a thorough scavenging of the cylinder, and in which the piston controls the admission to and the exhaust from the cylinder, thereby doing away with all valves; also to arrange the admission and exhaust ports and construct the piston so as to simplify the packing between the piston and cylinder and permit the use of a light piston so that the inertia thereof is minimized.

Figure 4:
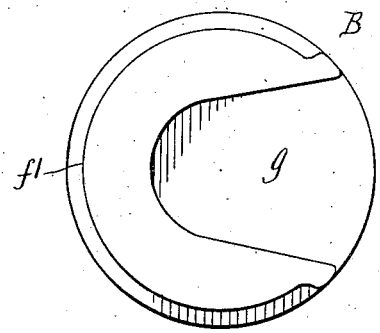
Figure 5:
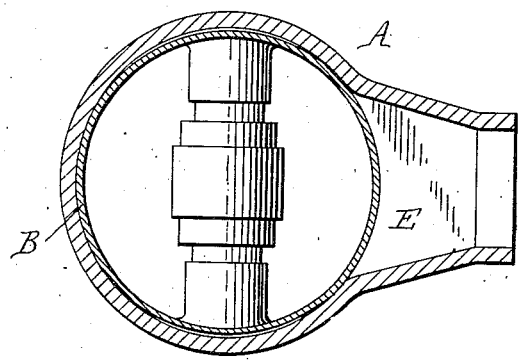
Figure 6:
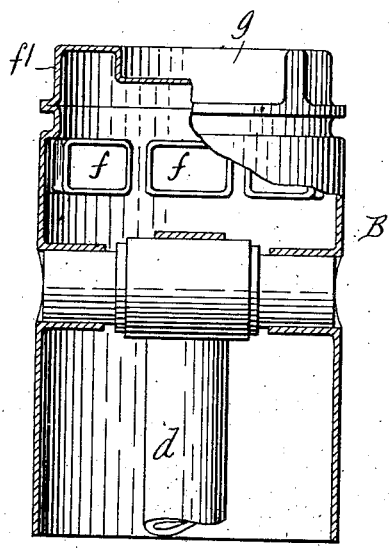
Figure 7:
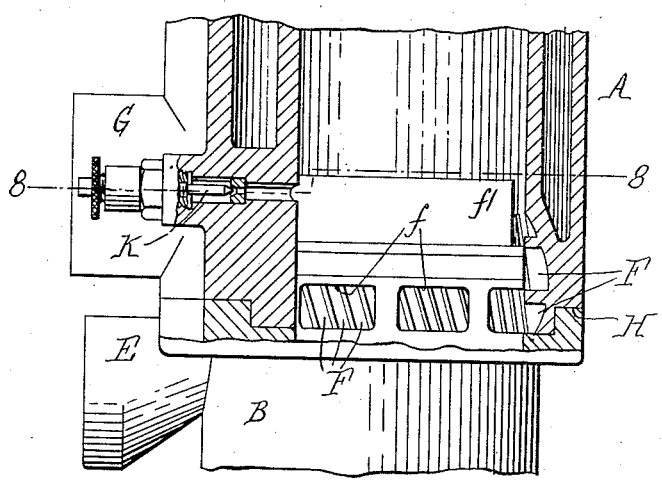
Figure 8:
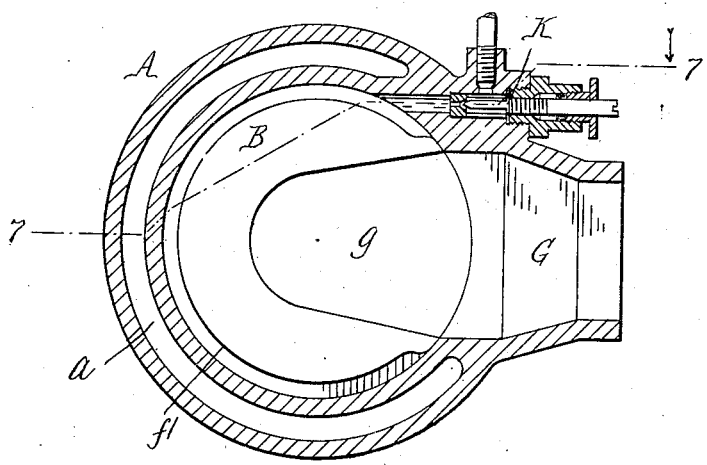

In the accompanying drawings, consisting of three sheets: Figure 1 is a longitudinal sectional elevation of an engine embodying the invention. Fig. 2 is a fragmentary section of the upper portion of the cylinder. Fig. 3 is an end view, partly in section, thereof. Fig. 4 is an end view of the piston. Fig. 5 is a horizontal section of the engine on line 5—5, Fig. 1. Fig. 6 is a view of the piston, partly in section, on line 6—6, Fig. 1. Fig. 7 is a fragmentary elevation partly in section on line 7—7, Fig. 8, of an engine provided with a different fuel supply means. Fig. 8 is a section on line 8—8, Fig. 7.

Like reference characters refer to like parts in the several figures.

The drawings represent the invention embodied in an upright engine.

In the embodiment thereof illustrated in Figs. 1–6, A represents the cylinder which is provided with the usual cooling jacket $a$ and with a hole $a'$ for a spark plug or igniter. B represents the piston, C the compression or crank chamber in which the charge of gaseous fuel is compressed before admission to the cylinder, D the crank shaft which rotates in the compression or crank chamber and is connected to the piston by a pitman or rod $d$. E represents the fuel supply port which is arranged in the lower portion of the cylinder at one side thereof, for supplying the gaseous fuel to the compression chamber when the piston is near the end of its upward or return stroke, the charge in the chamber being compressed by the piston during its power stroke. F represents admission or transfer passages, arranged interiorly in the lower portion of the cylinder, through which the compressed charge passes from the compression chamber into the explosion chamber, or upper end of the cylinder. The piston B is made hollow with a closed upper end or head and an open lower end, and is provided near its upper end with one or more side admission ports $f$ adapted to register with the admission or transfer passages F when the piston is near the end of its power stroke. The upper end or head of the piston is reduced in diameter above the admission ports $f$, thereby leaving an annular space between the peripheral wall $f'$ of this reduced end of the piston and the inner surface of the cylinder. When the piston nears the end of its power stroke its admission ports $f$ will register with the admission or transfer passages F in the cylinder and the upper ends of these passages F will connect with the annular space surrounding the reduced end of the piston, thus permitting the compressed fuel to flow from the compression chamber C through the ports $f$ and passages F into the explosion chamber or upper end of the cylinder. The piston is also provided with an exhaust port, channel or passage $g$ extending from the central or axial portion of its upper end or head to one side thereof and adapted to register with an exhaust port G in one side of the cylinder above the supply port E when the piston nears the end of the power stroke. The exhaust port or passage $g$ is preferably formed by a depressed portion of the upper end or head of the piston.

The admission or transfer passages F extend tangentially, obliquely or at an angle to radial planes passing through them so that the gaseous fuel issuing from these passages is caused to whirl or rotate in the explosion chamber. The peripheral wall $f'$ of the reduced head of the piston acts to deflect the gaseous fuel outwardly against the inner surface of the explosion chamber and form a whirling annular body of gas which is caused by centrifugal force to hug the walls of the cylinder. This whirling or rotating body of fresh fuel crowds the burnt gases inwardly toward the axial portion of the cylinder and drives them out through the exhaust passage $g$ and port G. In the construction shown, the tangential admission passages F are formed by a series of narrow oblique, or tangential, slots milled in the inner surface of the cylinder. The cylinder is preferably made in two parts, the joint H between which parts is located between the ends of the cylinder, at or near the admission or transfer passages F, instead of at the juncture of the cylinder with the crank chamber, as this construction facilitates the milling of the passages F in the cylinder.

The numerous metallic walls of considerable length which form the transfer passages exert a chilling effect upon the flame entering between the walls and prevent firing from the combustion to the compressing chamber, commonly called back firing, which is a serious fault with two-cycle engines and which occurs most frequently when the fuel mixture is poor in gasolene. Transfer passages milled into the wall of the cylinder so as to be about one-sixteenth of an inch wide and separated by walls about one-sixteenth of an inch thick operate satisfactorily in this respect, and this operation takes place whether the passages are arranged obliquely, so as to produce a whirling admission, or parallel with the axis of the cylinder and without reference to the location of the exhaust outlet. These narrow elongated passages, trending lengthwise of the cylinder, do not become clogged by dirt but are kept clear by the action of the gasolene and the force of the gas and permit of the use of a comparatively clean fuel mixture and prevent the balking of the engine from back firing.

The piston is preferably made from sheet metal drawn into the form shown, and the elasticity of the drawn metal piston is utilized to prevent leakage at the fuel supply and exhaust ports. The piston is made enough smaller in diameter than the internal diameter of the cylinder to allow for its expansion by heat and is pressed slightly out of round or into elliptical shape in cross-section, as shown in Fig. 5, the major axis of the ellipse extending in the direction of the fuel supply and exhaust ports E and G, so that the wall of the piston is held with a spring tension against the cylinder at the ports and effectually seals them against leakage without the use of packing rings. The heat at the exhaust port expands the piston in the same direction and while the wall of the piston will be held firmly against the side of the cylinder having the ports, the spring of the piston which is permitted by the clearance spaces between the opposite sides thereof and the adjacent walls of the cylinder will prevent the piston from scoring the cylinder. Pistons as commonly made are so rigid that if they were of sufficient diameter not to require packing rings they would score the cylinder at the exhaust port or stick when expanded by heat.

Leakage from the explosion chamber to the crank chamber is prevented by a single packing ring I near the upper end of the piston. The packing ring in this location does not cross the joint H in the cylinder and the described location of the ports and joint in the cylinder is therefore practical with a piston constructed as explained.

In the position of the parts represented in Fig. 1, the piston is at the end of the power stroke, the admission or transfer passages F and the exhaust port G are open and the fuel supply port E is closed. As the piston moves upwardly it closes the exhaust port G and the admission passages F and compresses the charge of fuel in the cylinder, and as it nears the end of the upward or return stroke its lower end uncovers the fuel supply port E, admitting fuel to the compression chamber C. When the charge is ignited, the force of the explosion drives the piston downwardly, the piston closing the fuel supply port E and compressing the charge in the compression chamber. Toward the end of the power stroke the piston uncovers the exhaust port G and, when the exhaust is partly opened and the pressure reduced in the cylinder, the admission passages F are uncovered and the fresh fuel rushes from the compression chamber into the cylinder, rotating in the same and driving the burnt gases out through the exhaust passages $g$ and port G as before explained. The whirling motion of the fresh fuel and the greater density thereof tend to keep the same separate from the lighter burnt gases, which form a diminishing and finally disappearing central or core portion in the body of gases in the cylinder. In this way the cylinder is quickly and thoroughly scavenged or freed from the burnt gases.

As shown by the drawings, the series of tangential admission or transfer passages F extend only part way around the cylinder from a point at one side of the exhaust port G to the opposite side thereof, and the exhaust passage $g$ in the head of the piston extends from the axial portion of the piston to the exhaust port G through the gap between the termini of the series of admission passages F, and this passage $g$ is depressed below the upper ends of the tangential fuel admission passages when the piston is at the end of the power stroke. By this arrangement a sheltered gap is provided under the whirling or spirally moving fuel in the cylinder for the outflow of the burnt gases, thus effecting practically an axial exhaust.

Figs. 7 and 8 illustrate an embodiment of the invention in which liquid fuel and air are separately supplied to and commingled in the cylinder to form the explosive mixture. In this engine the construction of the cylinder A and piston B and the arrangement of the supply port E, the tangential admission ports F, the exhaust passage $g$ in the piston and the exhaust port G are the same as before described, but air alone, instead of gaseous fuel, is compressed in the compression chamber C and supplied to the cylinder through the tangential admission passages F, and a nozzle K is provided for injecting liquid fuel directly into the cylinder to be mixed with the air as it is delivered tangentially into the cylinder by the admission passages F. The nozzle K is preferably arranged to deliver the fuel into the cylinder close to the admission passages F so as to take advantage of the more rapid absorption of the air, due to its expansion as it flows from the compression chamber into the lesser pressure of the cylinder. Another advantage of this arrangement in connection with the tangential air inlet is that the liquid fuel is distributed around the cylinder by the whirling movement of the air, and is thrown outwardly against the hot walls of the cylinder by the deflecting wall $f''$ of the piston and centrifugal force, thus effecting an immediate vaporization of the liquid fuel.

I claim as my invention:

1. In a two-cycle internal combustion engine, the combination of a cylinder provided in the cylindrical wall thereof with a plurality of admission passages, and an exhaust port, said admission passages being arranged at substantially corresponding angularity to the direction of the length of the cylinder such as to cause the charge to rotate in the cylinder, and a piston provided with an exhaust passage leading from one end thereof and adapted to register with the exhaust port in the wall of the cylinder, said admission passages and said exhaust port being located so as to be uncovered by the piston when it nears the end of its power stroke, substantially as set forth.

2. In a two-cycle internal combustion engine, the combination of a cylinder provided in the cylindrical wall thereof with a plurality of admission passages, and an exhaust port, said admission passages being arranged at substantially corresponding angularity to the direction of the length of the cylinder such as to cause the charge to rotate in the cylinder, and a piston provided at one end with an exhaust passage extending from the axial portion to the side thereof and adapted to register with said exhaust port in the wall of the cylinder, said admission passages and said exhaust port being located so as to be uncovered by the piston when it nears the end of its power stroke, substantially as set forth.

3. In a two-cycle internal combustion engine, the combination of a compression chamber, a cylinder provided in the cylindrical wall thereof with an admission passage which connects the compression chamber and the cylinder, and an exhaust port, said admission passage being arranged at substantially corresponding angularity to the direction of the length of the cylinder such as to cause the charge to rotate in the cylinder, and a piston provided with a port adapted to connect said compression chamber with said admission passage, and an exhaust passage leading from one end thereof and adapted to register with said exhaust port in the cylinder, said admission passage and said exhaust port being located so as to be uncovered by the piston when it nears the end of its power stroke, substantially as set forth.

4. In a two-cycle internal combustion engine, the combination of a cylinder provided in the cylindrical wall thereof with a series of relatively narrow admission passages extending for a considerable distance around the cylinder, and an exhaust port located between the termini of said series of admission passages, said admission passages being arranged at substantially corresponding angularity to the direction of the length of the cylinder such as to cause the charge to rotate in the cylinder, said admission passages and said exhaust port being located so as to be uncovered by the piston when it nears the end of its power stroke, substantially as set forth.

5. In a two-cycle internal combustion engine, the combination of a cylinder provided with a series of admission passages extending part way around the cylinder, and an exhaust port located between the termini of said series of admission passages, said admission passages being arranged at substantially corresponding angularity to the direction of the length of the cylinder such as to cause the charge to rotate in the cylinder, and a piston provided at one end with an exhaust passage extending from the axial portion to one side thereof and adapted to register with said exhaust port in the cylinder, substantially as set forth.

6. In a two-cycle internal combustion engine, the combination of a cylinder provided with a series of admission passages extending part way around the cylinder, and an exhaust port located between the termini of said series of admission passages, said admission passages being arranged at substantially corresponding angularity to the direction of the length of the cylinder such as to cause the charge to rotate in the cylinder, and a piston provided at one end with a depression forming an exhaust passage which is adapted to register with said exhaust port in the cylinder when the piston nears the end of its power stroke, substantially as set forth.

7. In a two-cycle internal combustion engine, the combination of a cylinder provided in the cylindrical wall thereof with an admission passage, and an exhaust port, said admission passages being arranged at substantially corresponding angularity to the direction of the length of the cylinder such as to cause the charge to rotate in the cylinder, and a piston provided with a reduced portion having a peripheral surface which deflects the incoming charge against the wall of the cylinder, said admission passage and said exhaust port being located so as to be uncovered by the piston when it nears the end of its power stroke, substantially as set forth.

8. In a two-cycle internal combustion engine, the combination of a cylinder provided with a series of admission passages extending part way around the cylinder, and an exhaust port located between the termini of said series of admission passages, said admission passages being arranged at an angle to the direction of the length of the cylinder such as to cause the charge to rotate in the cylinder, and a piston provided with a reduced end having a peripheral wall which deflects the incoming charge against the wall of the cylinder and an end depression forming an exhaust passage which is adapted to register with said exhaust port in the cylinder when the piston nears the end of its power stroke, substantially as set forth.

9. In a two-cycle internal combustion engine, the combination of a cylinder provided with admission and exhaust ports at one side in its cylindrical wall, and a hollow piston having elastic walls which bear against the cylindrical wall of the cylinder only at the side thereof having said ports and at the opposite side of the cylinder to prevent leakage between the ports, said piston having a packing ring to prevent leakage past the piston, substantially as set forth.

10. In a two-cycle internal combustion engine, the combination of a cylinder provided with admission and exhaust ports at one side in its cylindrical wall and composed of parts which join between said ports, and a hollow piston of substantially elliptical shape having elastic walls which bear against the cylindrical wall of the cylinder at the side thereof having said ports and at the opposite side of the cylinder to prevent leakage between the ports, said piston having a packing ring near one end to prevent leakage past the piston, substantially as set forth.

11. In a two-cycle internal combustion engine, the combination of a compression chamber, a combustion chamber, and a relatively large number of closely arranged long narrow transfer passages through which the charge passes from the compression chamber to the combustion chamber, said passages being controlled by the piston and arranged at substantially corresponding angularity to the direction of the length of the cylinder such as to cause the charge to rotate in the cylinder and being of a length several times greater than their width and separated by relatively thin partition walls which are at least substantially as thin as the width of the passages so as to prevent back firing.

12. In a two-cycle internal combustion engine, the combination of a cylinder provided interiorly with air admission passages arranged in the cylindrical wall of the cylinder at an angle to the direction of the length of the cylinder such as to cause the air to rotate in the cylinder, a piston having a reduced portion which uncovers said admission passages, and means for introducing fuel into the annular space formed between the reduced portion of the piston and the surrounding wall of the cylinder, substantially as set forth.

13. In a two-cycle internal combustion engine, the combination of a compression chamber, a combustion chamber, and a plurality of narrow, elongated transfer passages through which the charge passes from the compression chamber to the combustion chamber and which prevent back firing, said passages being controlled by the piston and arranged close together and at substantially corresponding angularity to the direction of the length of the cylinder such as to cause the charge to rotate in the cylinder, and an exhaust port being provided adjacent to said transfer passages, substantially as set forth.

14. In a two-cycle internal combustion engine, the combination of a compression chamber, and a cylinder provided with a series of interiorly arranged, narrow, elongated transfer passages which connect the compression chamber with the combustion chamber of the cylinder, said passages being arranged close together and at substantially corresponding angularity to the direction of the length of the cylinder such as to cause the charge to rotate in the cylinder, and an exhaust port being provided between the ends of said series of transfer passages, substantially as set forth.

Witness my hand in the presence of two subscribing witnesses.

HERBERT McCORNACK.

Witnesses:
KATIE T. O'BRIEN,
F. M. HOLIDAY.